(12) United States Patent
Chen

(10) Patent No.: US 10,625,665 B1
(45) Date of Patent: Apr. 21, 2020

(54) FLASHER RELAY

(71) Applicant: Kuo-Hua Chen, Chang Hua (TW)

(72) Inventor: Kuo-Hua Chen, Chang Hua (TW)

( * ) Notice: Subject to any disclaimer, the term of this patent is extended or adjusted under 35 U.S.C. 154(b) by 0 days.

(21) Appl. No.: 16/425,936

(22) Filed: May 29, 2019

(30) Foreign Application Priority Data

Mar. 19, 2019 (TW) .............................. 108109427 A

(51) Int. Cl.
| | |
|---|---|
| *B60Q 1/52* | (2006.01) |
| *B60Q 1/38* | (2006.01) |
| *H01H 45/12* | (2006.01) |
| *H05B 39/06* | (2006.01) |
| *G08B 5/38* | (2006.01) |

(52) U.S. Cl.
CPC ................ *B60Q 1/38* (2013.01); *G08B 5/38* (2013.01); *H01H 45/12* (2013.01); *H05B 39/06* (2013.01)

(58) Field of Classification Search
CPC .......... B60Q 11/007; B60Q 1/34; B60Q 1/26; B60Q 1/38; B60R 1/1207; H03K 21/18; H01H 45/12; H05B 39/06; G08B 5/38; G08G 1/166
See application file for complete search history.

(56) References Cited

U.S. PATENT DOCUMENTS

| | | | | |
|---|---|---|---|---|
| 3,763,469 A * | 10/1973 | Yonezu | ..................... | B60Q 1/38 340/458 |
| 3,838,392 A * | 9/1974 | Lockwood | ............... | B60Q 1/46 340/433 |
| 4,042,908 A * | 8/1977 | Amano | ................ | B60Q 11/005 340/458 |
| 4,196,415 A * | 4/1980 | Haar | ...................... | B60Q 1/385 340/326 |
| 4,236,143 A * | 11/1980 | Mizuno | ................ | B60Q 11/007 340/458 |
| 4,241,328 A * | 12/1980 | Lobe | .................... | B60Q 11/007 340/457 |
| 5,005,004 A * | 4/1991 | Udofot | ..................... | B60Q 1/52 250/214 R |
| 5,099,222 A * | 3/1992 | Campagna | ............... | B60Q 1/38 340/457 |
| 5,218,340 A * | 6/1993 | Shannon, Jr. | ............ | B60Q 1/22 307/10.8 |
| 5,770,999 A * | 6/1998 | Rhodes | .................... | B60Q 1/00 307/10.8 |
| 6,150,765 A * | 11/2000 | Crunk | ..................... | B60Q 1/38 315/129 |

(Continued)

*Primary Examiner* — An T Nguyen
(74) *Attorney, Agent, or Firm* — Bruce Stone LLP; Joseph A. Bruce

(57) ABSTRACT

A flasher relay for driving a left turn signal lamp and a right turn signal lamp of a vehicle to flash includes a main body and a control circuit. The main body includes a base, a casing, and a circuit board. The circuit board is disposed on the base. The casing is mounted on the base and covers the circuit board. The control circuit is disposed on the circuit board. The control circuit includes a microchip having an input terminal coupled to a field-effect transistor and an electromagnetic buzzer. A drain of the field-effect transistor and one end of the electromagnetic buzzer are coupled to a node B. A heat dissipation terminal of the field-effect transistor is coupled to the node B, and the node B guides thermal energy to a wire.

7 Claims, 7 Drawing Sheets

(56) References Cited

U.S. PATENT DOCUMENTS

| | | | |
|---|---|---|---|
| 2003/0193301 A1* | 10/2003 | Crunk | H05B 45/00 315/291 |
| 2013/0127638 A1* | 5/2013 | Harrison | G08G 1/166 340/903 |
| 2018/0006641 A1* | 1/2018 | Jensen | H03K 17/163 |

* cited by examiner

FLASHER RELAY

FIELD OF THE INVENTION

The present invention relates to a relay, and more particularly to a flasher relay.

BACKGROUND OF THE INVENTION

A flasher relay is an electronic control unit, having a control system (also known as an input circuit) and a controlled system (also known as an output circuit), which is widely used in an automatic control circuit. In actual, it is an automatic switch that uses a small current to control a large current. Therefore, it plays the roles of automatic adjustment, safety protection, conversion circuit, and so on.

Nowadays, various vehicles, such as cars, motorcycles and electric cars, each have a left turn signal lamp and a right turn signal lamp on both sides of the vehicle. In general, the circuit uses a flasher relay to control the left turn signal lamp and the right turn signal lamp to flash for reminding other drivers or passersby to pay attention to the moving direction of the vehicle. However, the quality of a thermocouple-type flasher relay is unstable, so the number of variables is large and the service life is relatively short. For a capacitor-type flasher relay, although it has a longer service life than the thermocouple-type flasher relay, the capacitor-type flasher relay has the following disadvantages: sensitive to temperature changes, large volume, heavy weight, and unstable flashes. An electronic flasher relay has no contact and is a silent flasher relay with poor heat dissipation. It is necessary to provide an additional heat sink, which results in an increase in cost. Only the heat sink is configured to dissipate heat. It is not easy to dissipate heat. Although the number of flashes is stable, when used for a long time, it is easy to overheat and burn. The above-mentioned flasher relays are adapted for voltages of 6V, 12V, 24V. When they are applied to high voltages such as 48V-60V or more, it is difficult for production. Accordingly, the inventor of the present invention has devoted himself based on his many years of practical experiences to solve these problems.

SUMMARY OF THE INVENTION

The primary object of the present invention is to provide a flasher relay, which has the advantages of low cost, high mass-production efficiency, improving industrial competitiveness, long service life, small size, and light weight.

Another object of the present invention is to provide a flasher relay without a heat sink.

A further object of the present invention is to provide a flasher relay with an adjustable voltage of 3V-100V.

In order to achieve the above objects, the present invention provides a flasher relay for driving a left turn signal lamp and a right turn signal lamp of a vehicle to flash. The flasher relay comprises a main body and a control circuit. The main body includes a base, a casing, and a circuit board. The circuit board is disposed on the base. The casing is mounted on the base and covers the circuit board. The control circuit is disposed on the circuit board. The control circuit includes a microchip having an input terminal coupled to a field-effect transistor and an electromagnetic buzzer. A drain of the field-effect transistor and one end of the electromagnetic buzzer are coupled to a node B. A source of the field-effect transistor and another end of the electromagnetic buzzer are coupled to a node L. A first output terminal of the microchip is coupled to a first transistor and a second transistor. A second output terminal of the microchip is coupled to a fourth transistor and a fifth transistor. A collector of the fifth transistor is coupled to a node P.

Preferably, the control circuit supplies power to the microchip through an external power source to drive the microchip to be continuous ON and OFF and enable the left turn signal lamp or the right turn signal lamp to flash. The electromagnetic buzzer is charged and discharged by a capacitor, so that the electromagnetic buzzer emits intermittent sounds.

Preferably, the external power source is coupled to a single-pole single-throw (SPST) switch connected to the node B.

Preferably, the node L is coupled to one end of a turn signal lamp switch (TS), and another end of the turn signal lamp switch is coupled to the left turn signal lamp and the right turn signal lamp.

Preferably, the node P is coupled to a warning lamp.

Preferably, a heat dissipation terminal of the field-effect transistor is coupled to the node B, and the node B guides thermal energy to a wire so that the heat of the field-effect transistor can be dissipated effectively.

Preferably, the casing has a hole.

BRIEF DESCRIPTION OF THE DRAWINGS

FIG. 6 is a circuit diagram of the present invention, showing that the turn signal lamp switch is connected for the left turn signal lamp to be turned on; and FIG. 7 is a circuit diagram of the present invention, showing that the turn signal lamp switch is connected for the right turn signal lamp to be turned on.

DETAILED DESCRIPTION OF THE PREFERRED EMBODIMENTS

Figure 1:
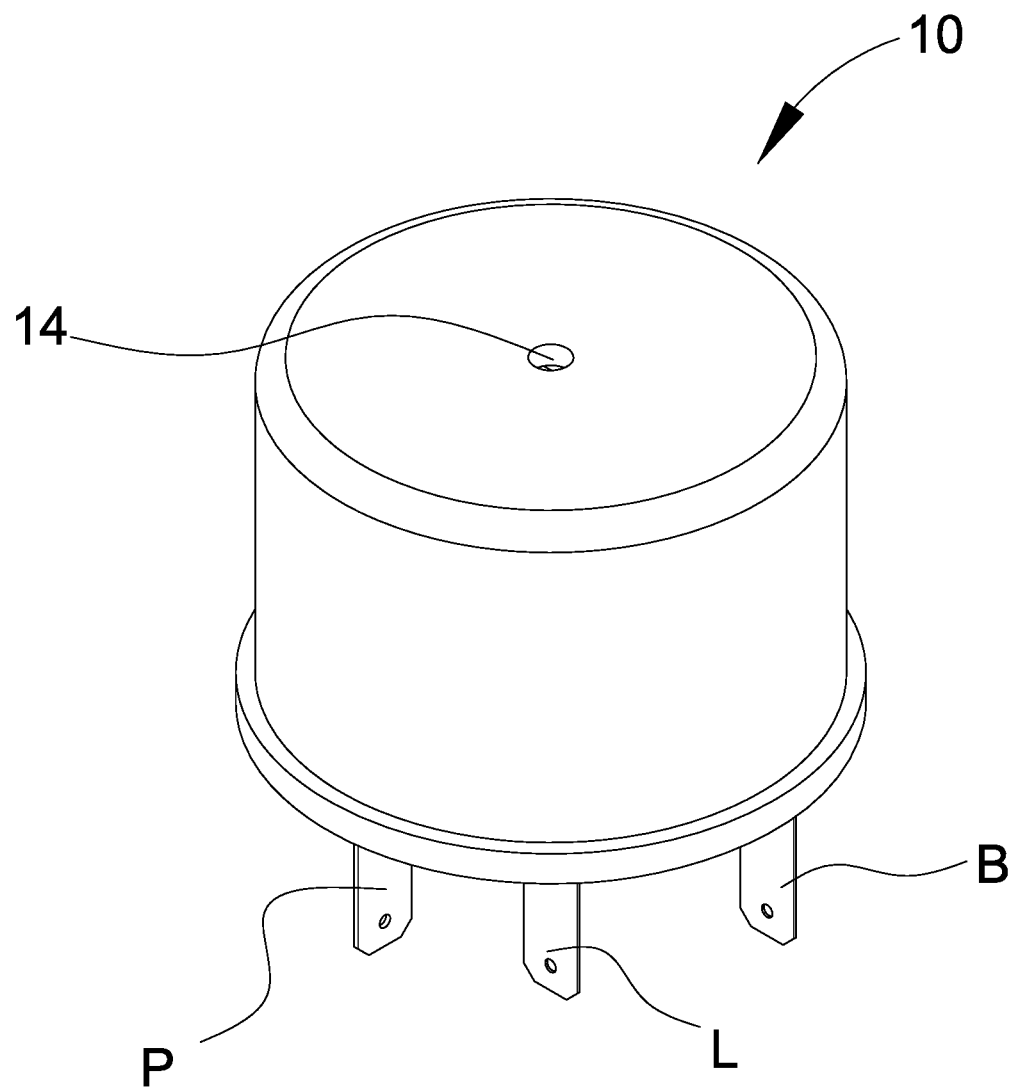
FIG. 1 is a perspective view of the present invention.
Figure 2:
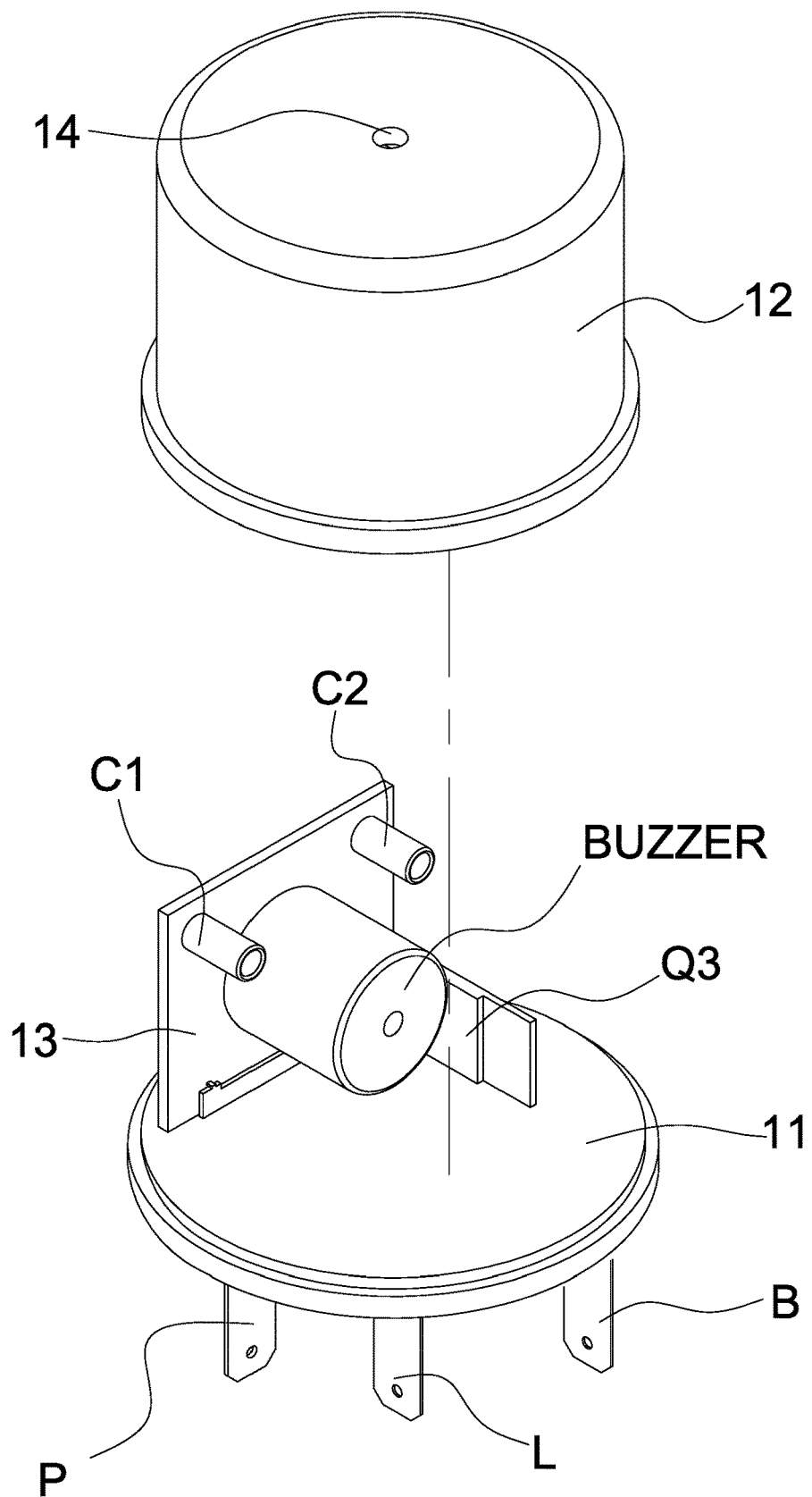
FIG. 2 is an exploded view of the present invention.
Figure 3:
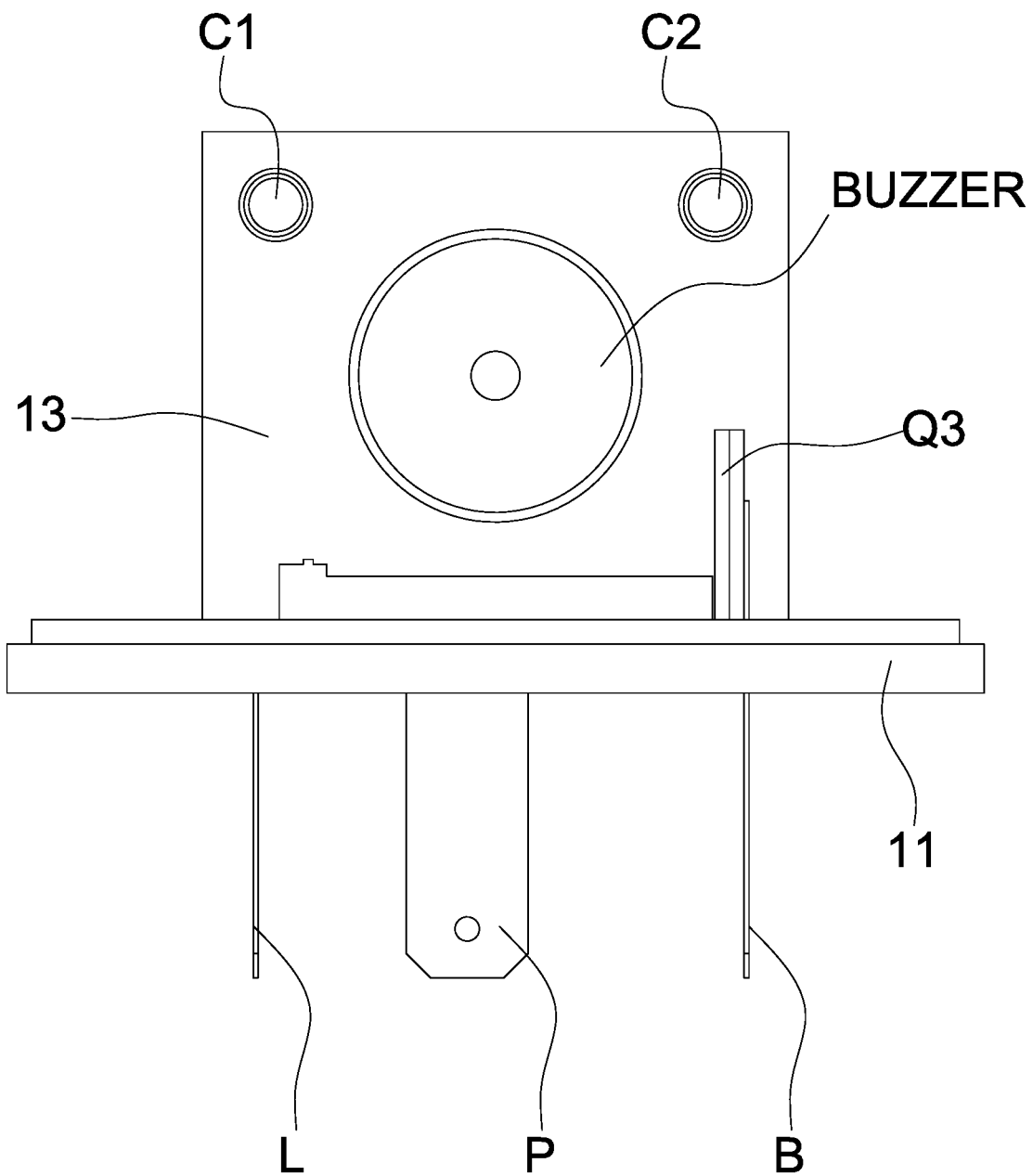
FIG. 3 is a front view of the base and the circuit board of the present invention.
Figure 4:
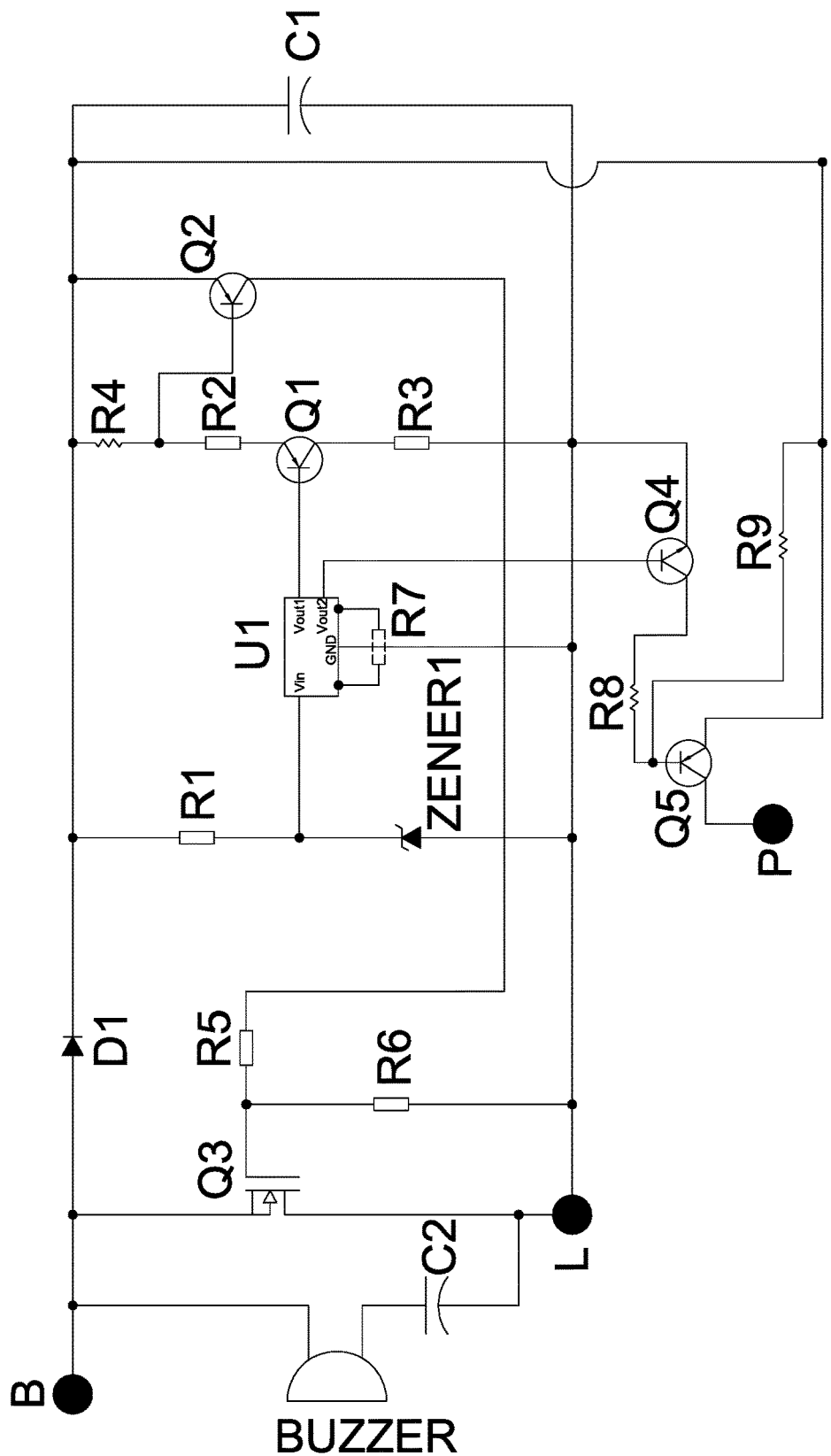
FIG. 4 is a circuit diagram of the present invention.
Figure 5:
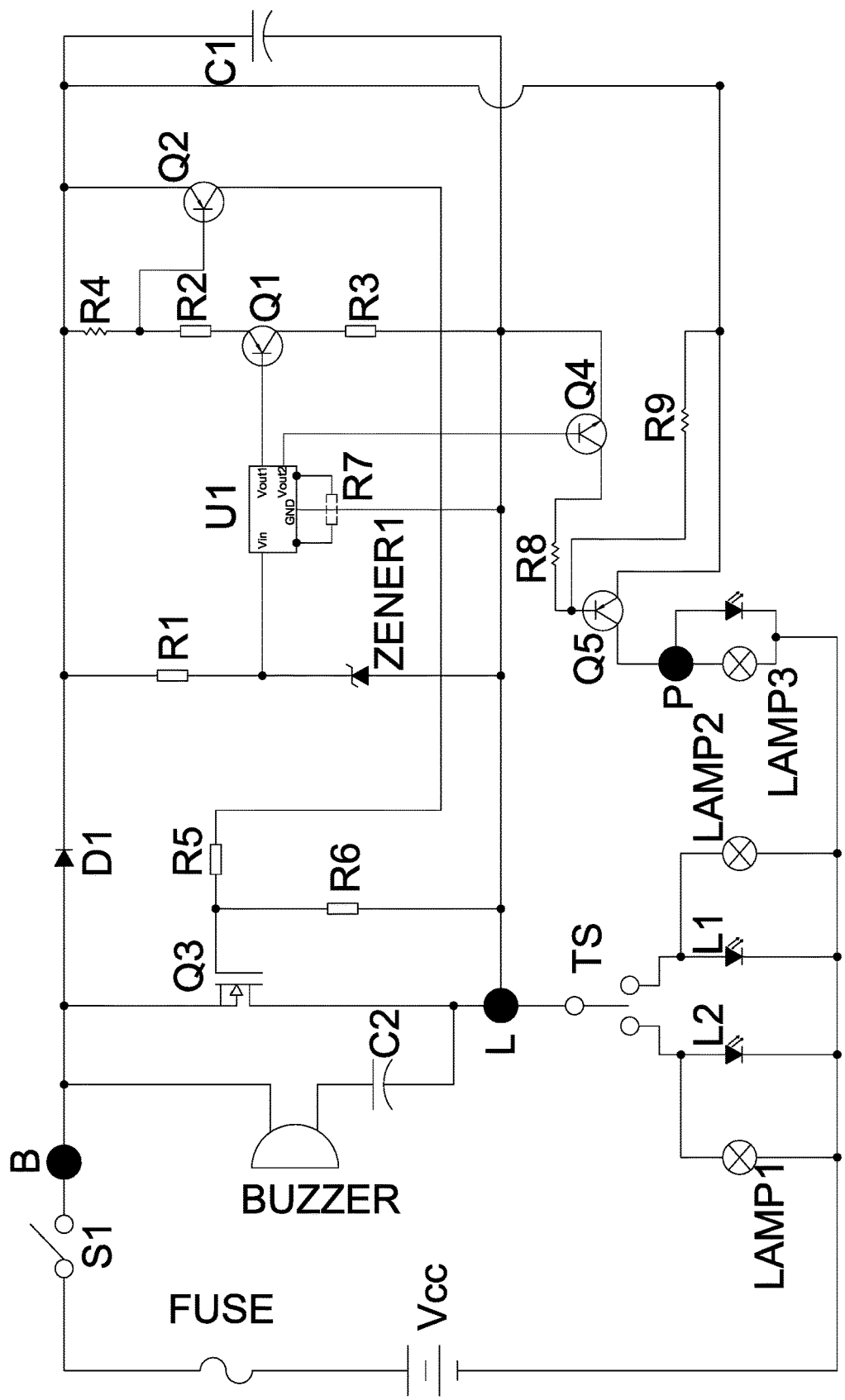
FIG. 5 is a circuit diagram of the present invention combined with the external power source, the left turn signal lamp, the right turn signal lamp and the warning lamp.

Embodiments of the present invention will now be described, by way of example only, with reference to the accompanying drawings.

Referring to FIG. 1 through FIG. 5, a flasher relay according to a preferred embodiment of the present invention comprises a main body 10 and a control circuit 20.

The main body 10 includes a base 11, a casing 12, and a circuit board 13. The circuit board 13 is disposed on the base 11. The casing 12 is mounted on the base 11 and covers the circuit board 13.

The control circuit 20 is disposed on the circuit board 13. The control circuit 20 includes a microchip U1 having an input terminal coupled to a field-effect transistor Q3 and an electromagnetic buzzer. The drain of the field-effect transistor Q3 and one end of the electromagnetic buzzer are coupled to a node B. The source of the field-effect transistor Q3 and another end of the electromagnetic buzzer are coupled to a node L. A first output terminal Vout1 of the microchip U1 is coupled to a first transistor Q1 and a second transistor Q2. A second output terminal Vout2 of the microchip U1 is coupled to a fourth transistor Q4 and a fifth transistor Q5. The collector of the fifth transistor Q5 is coupled to a node P.

The control circuit 20 supplies power to the microchip U1 through an external power source Vcc to drive the microchip U1 to be continuous ON and OFF and enable a left turn signal lamp LAMP1 or a right turn signal lamp LAMP2 to flash. At the same time, the electromagnetic buzzer is charged and discharged by a capacitor C2, so that the electromagnetic buzzer emits intermittent sounds. The casing 12 has a hole 14 for allowing the sound of the electromagnetic buzzer to be transmitted to the outside through the hole 14. The design of the present invention can reduce labor and material costs, without the cumbersome process of the prior art for tapping sounds. The design of the hole 14 of the present invention can reduce the cost and improve the heat dissipation effect to solve the problem of the prior art that needs a heat sink and has a poor heat dissipation effect.

The external power source Vcc is coupled to a single-pole single-throw (SPST) switch S1 connected to the node B. The node L is coupled to a turn signal lamp switch TS. Another end of the turn signal lamp switch TS is coupled to the left turn signal lamp LAMP1 and the right turn signal lamp LAMP2. The node P is coupled to a warning lamp LAMP3.

A heat dissipation terminal of the field-effect transistor Q3 is coupled to the node B. The node B guides the thermal energy to a wire.

Figure 6:
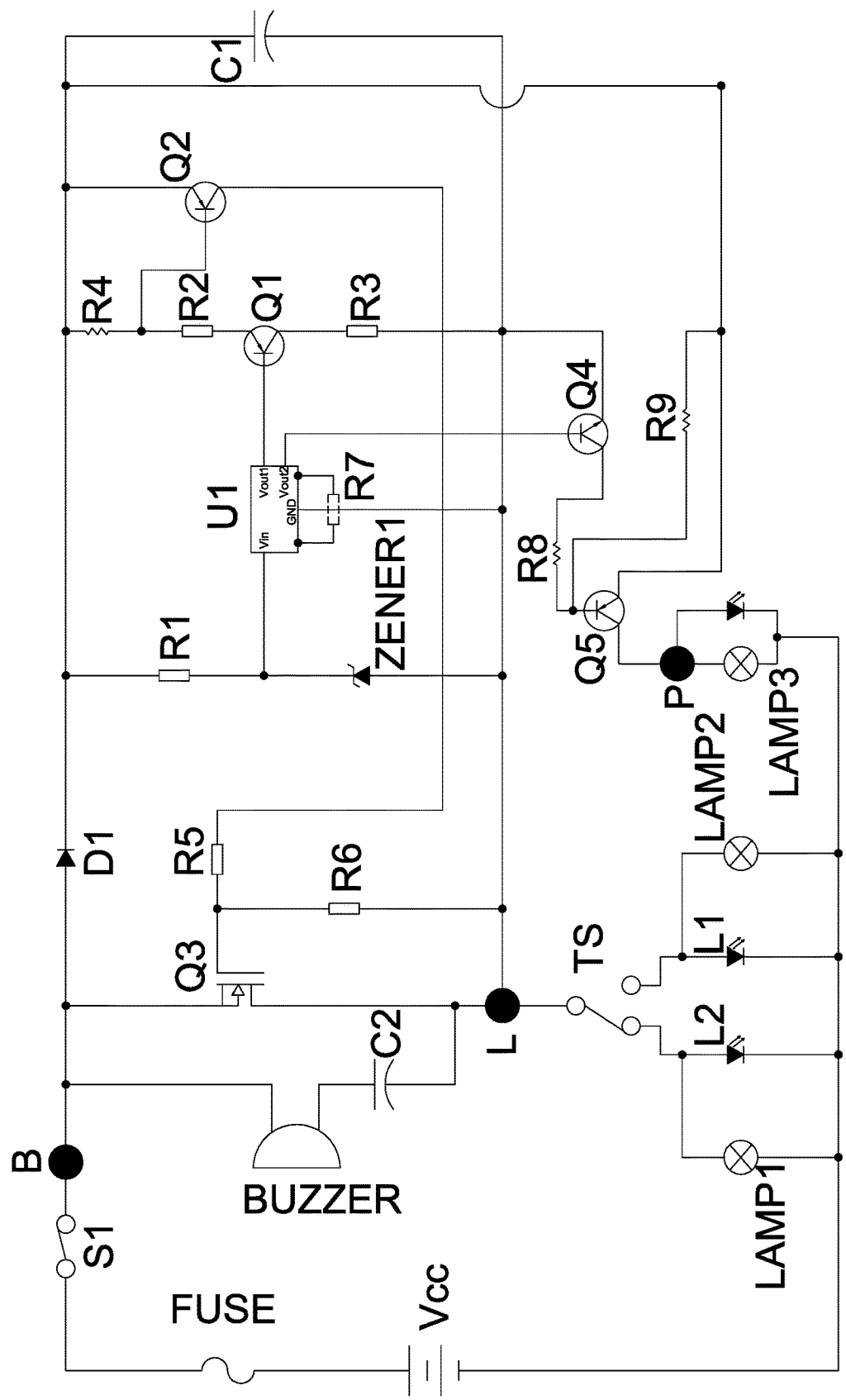

The foregoing is about the components and the circuit of the flasher relay provided by the preferred embodiment of the present invention. The use characteristics of the present invention are described as follows:

FIG. 6 is a circuit diagram of the present invention. First, the SPST switch S1 is connected. When the turn signal lamp switch TS is switched to the left to be ON, the capacitor C1 is in a charged state. The microchip U1 obtains power through a resistor R1 and a zener diode Z1 for operation. After the microchip U1 is operated, the ON and OFF states are continuously repeated and output to the first transistor Q1 and the fourth transistor Q4, so that the first transistor Q1 and the fourth transistor Q4 are in intermittent ON and OFF states. After the first transistor Q1 is connected, the current enables the second transistor Q2 to be connected via the resistor R2, and then the field-effect transistor Q3 is connected via the resistor R5, so that the left turn signal lamp LAMP1 flashes. After the fourth transistor Q4 is connected, the current enables the fifth transistor Q5 to be connected via the resistor R8, thereby causing the warning lamp LAMP3 connected with the node P to flash. At the same time, the electromagnetic buzzer is charged via capacitor C2 to emit a short tapping sound. When the capacitor C2 is fully charged, the tapping sound stops. When the third transistor Q3 is connected, the capacitor C2 is discharged via the electromagnetic buzzer to emit a short tapping sound again. When the third transistor Q3 is operated repeatedly as described above, the electromagnetic buzzer can emit a continuous tapping sound until the turn signal lamp switch TS is turned off. The power supply to the capacitor C1 disappears, and the left turn signal lamp LAMP1 stops flashing.

Figure 7:
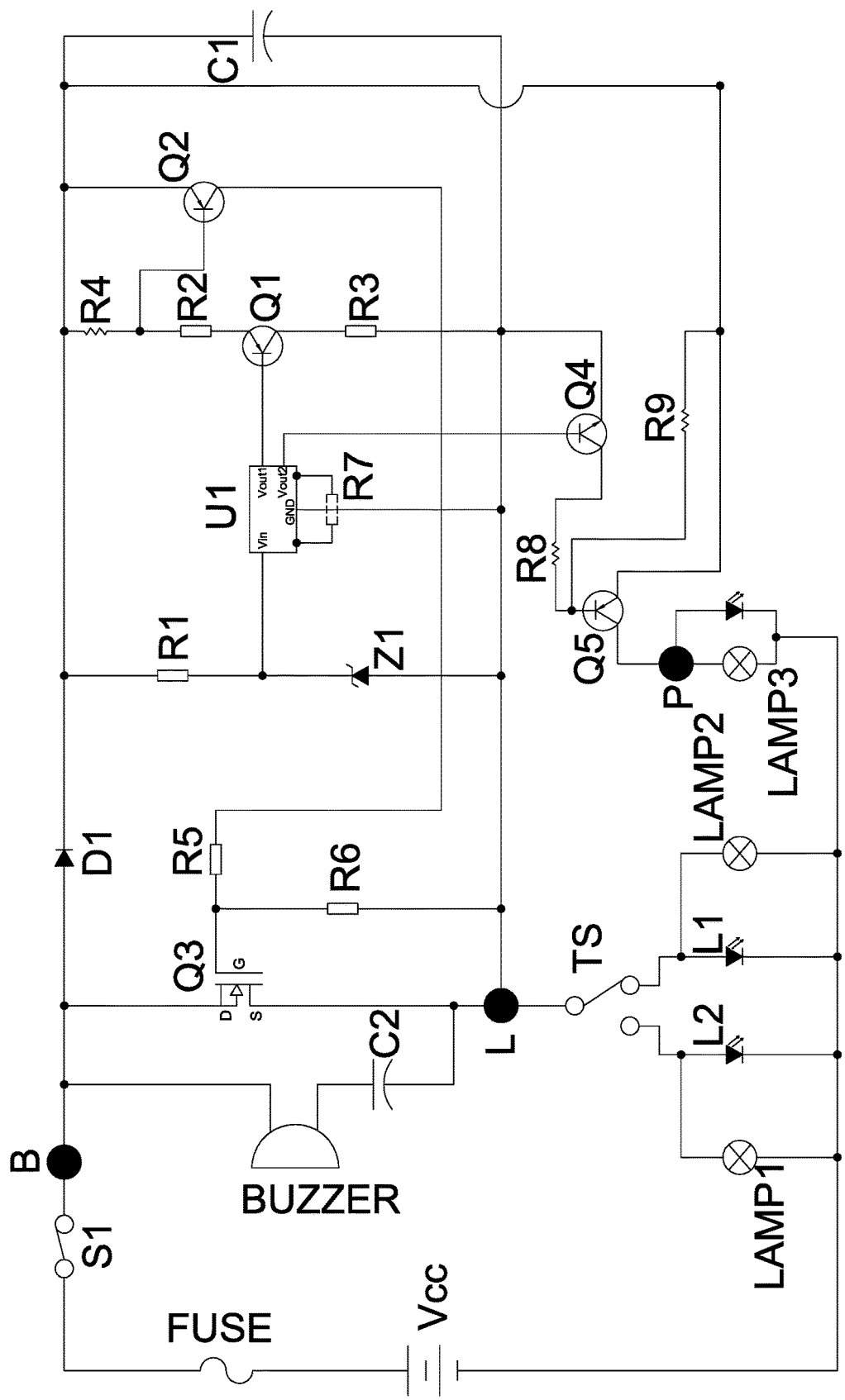

FIG. 7 is a circuit diagram of the present invention. First, the SPST switch S1 is connected. When the turn signal lamp switch TS is switched to the right to be ON, the capacitor C1 is in a charged state. The microchip U1 obtains power through the resistor R1 and the zener diode Z1 for operation. After the microchip U1 is operated, the ON and OFF states are continuously repeated and output to the first transistor Q1 and the fourth transistor Q4, so that the first transistor Q1 and the fourth transistor Q4 are in intermittent ON and OFF states. After the first transistor Q1 is connected, the current enables the second transistor Q2 to be connected via the resistor R2, and then the field-effect transistor Q3 is connected via the resistor R5, so that the right turn signal lamp LAMP2 flashes. After the fourth transistor Q4 is connected, the current enables the fifth transistor Q5 to be connected via the resistor R8, thereby causing the warning lamp LAMP3 connected with the node P to flash. At the same time, the electromagnetic buzzer is charged via capacitor C2 to emit a short tapping sound. When the capacitor C2 is fully charged, the tapping sound stops. When the third transistor Q3 is connected, the capacitor C2 is discharged via the electromagnetic buzzer to emit a short tapping sound again. When the third transistor Q3 is operated repeatedly as described above, the electromagnetic buzzer can emit a continuous tapping sound until the turn signal lamp switch TS is turned off. The power supply to the capacitor C1 disappears, and the right turn signal lamp LAMP2 stops flashing.

The heat dissipation terminal of the field-effect transistor Q3 is coupled to the node B. The node B guides the thermal energy to a wire. The length of the wire can lengthen the area of heat dissipation, thereby increasing the range of heat dissipation. Because the wire is made of copper with good thermal conductivity, the heat of the field-effect transistor Q3 is dissipated effectively. Lamps of the same specification can adopt a lower wattage specification. Conventional field-effect transistors have a longer service life, thereby reducing material costs and making the present invention more competitive in the market. Therefore, the present invention has the following advantages: 1. long service life; 2. fast heat dissipation; 3. small volume; 4. light weight; 5. using the capacitor C2 for charging and discharging intermittently, the electromagnetic buzzer emits tapping sounds regularly, and the sounds can be up to 80 decibels; 6. consumers can purchase longer-life products at a lower price.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A flasher relay for driving a left turn signal lamp and a right turn signal lamp of a vehicle to flash, comprising:
 a main body, including a base, a casing and a circuit board, the circuit board being disposed on the base, the casing being mounted on the base and covering the circuit board;
 a control circuit, disposed on the circuit board, the control circuit including a microchip having an input terminal coupled to a field-effect transistor and an electromagnetic buzzer, a drain of the field-effect transistor and one end of the electromagnetic buzzer being coupled to a node B, a source of the field-effect transistor and another end of the electromagnetic buzzer being coupled to a node L, a first output terminal of the microchip being coupled to a first transistor and a second transistor, a second output terminal of the microchip being coupled to a fourth transistor and a fifth transistor, a collector of the fifth transistor being coupled to a node P.

2. The flasher relay as claimed in claim 1, wherein the control circuit supplies power to the microchip through an external power source to drive the microchip to be continuous ON and OFF and enable the left turn signal lamp or the right turn signal lamp to flash, and the electromagnetic buzzer is charged and discharged by a capacitor, so that the electromagnetic buzzer emits intermittent sounds.

3. The flasher relay as claimed in claim 2, wherein the external power source is coupled to a single-pole single-throw (SPST) switch connected to the node B.

4. The flasher relay as claimed in claim 1, wherein the node L is coupled to one end of a turn signal lamp switch (TS), and another end of the turn signal lamp switch is coupled to the left turn signal lamp and the right turn signal lamp.

5. The flasher relay as claimed in claim 1, wherein the node P is coupled to a warning lamp.

6. The flasher relay as claimed in claim 1, wherein a heat dissipation terminal of the field-effect transistor is coupled to the node B, and the node B guides thermal energy to a wire.

7. The flasher relay as claimed in claim 1, wherein the casing has a hole.

* * * * *